(12) United States Patent
Vankamamidi et al.

(10) Patent No.: US 11,366,601 B2
(45) Date of Patent: Jun. 21, 2022

(54) REGULATING STORAGE DEVICE REBUILD RATE IN A STORAGE SYSTEM

(71) Applicant: EMC IP Holding Company LLC, Hopkinton, MA (US)

(72) Inventors: Vamsi K. Vankamamidi, Hopkinton, MA (US); Shuyu Lee, Acton, MA (US); Kurt W. Everson, Richmond, TX (US); Pavan Kumar Vutukuri, Chelmsford, MA (US); Andrew P. Kubicki, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/907,560

(22) Filed: Jun. 22, 2020

(65) Prior Publication Data

US 2021/0397360 A1    Dec. 23, 2021

(51) Int. Cl.
| | |
|---|---|
| G06F 3/06 | (2006.01) |
| G06F 9/48 | (2006.01) |
| G06F 11/10 | (2006.01) |
| G06F 11/16 | (2006.01) |

(52) U.S. Cl.
CPC ......... *G06F 3/0649* (2013.01); *G06F 3/0619* (2013.01); *G06F 3/0653* (2013.01); *G06F 3/0689* (2013.01); *G06F 9/4881* (2013.01); *G06F 11/1092* (2013.01); *G06F 11/1662* (2013.01)

(58) Field of Classification Search
CPC .... G06F 3/0649; G06F 3/0619; G06F 3/0653; G06F 3/0689; G06F 11/1092; G06F 11/1662; G06F 9/4881
See application file for complete search history.

(56) References Cited

U.S. PATENT DOCUMENTS

| | | | |
|---|---|---|---|
| 6,609,145 B1 * | 8/2003 | Thompson | G06F 11/1076 718/103 |
| 7,975,168 B2 * | 7/2011 | Morita | G06F 11/2094 714/6.22 |

(Continued)

OTHER PUBLICATIONS

G. Xu et al., "LIPA: A Learning-based Indexing and Prefetching Approach for Data Deduplication," Conference: 2019 35th Symposium on Mass Storage Systems and Technologies (MSST), May 20-24, 2019, 12 pages.

(Continued)

*Primary Examiner* — Matthew M Kim
*Assistant Examiner* — Matthew N Putaraksa
(74) *Attorney, Agent, or Firm* — Ryan, Mason & Lewis, LLP

(57) ABSTRACT

An apparatus comprises at least one processing device comprising a processor coupled to a memory; the at least one processing device being configured to: obtain a set of rebuild rate parameters for a given storage device from a storage array comprising a plurality of storage devices; and dynamically regulate a rebuild rate associated with a rebuild process for the given storage device based on the set of rebuild rate parameters obtained from the storage array for the given storage device. For example, the set of rebuild rate parameters include a rebuild capacity parameter and a rebuild time parameter.

20 Claims, 6 Drawing Sheets

(56) References Cited

U.S. PATENT DOCUMENTS

| | | | | |
|---|---|---|---|---|
| 8,880,801 | B1* | 11/2014 | Robins | G06F 11/1092 711/114 |
| 8,954,383 | B1 | 2/2015 | Vempati et al. | |
| 9,003,227 | B1 | 4/2015 | Patel et al. | |
| 9,104,675 | B1 | 8/2015 | Clark et al. | |
| 9,778,996 | B1 | 10/2017 | Bono et al. | |
| 10,210,048 | B2 | 2/2019 | Sancheti | |
| 10,474,367 | B1 | 11/2019 | Mallick et al. | |
| 2014/0143594 | A1* | 5/2014 | Belhadj | G06F 11/1092 714/6.22 |
| 2014/0215147 | A1* | 7/2014 | Pan | G06F 11/1092 711/114 |
| 2014/0223223 | A1* | 8/2014 | Akutsu | G06F 11/2046 714/6.22 |
| 2014/0359348 | A1* | 12/2014 | Volvovski | G06F 3/06 714/6.22 |
| 2016/0292035 | A1* | 10/2016 | Alcorn | G06F 11/0757 |
| 2020/0226038 | A1* | 7/2020 | Peltz | G06F 3/0619 |

OTHER PUBLICATIONS

NVM Express, "NVM Express, Revision 1.3," NVM Express, May 1, 2017, 282 pages.

Commvault, "Storage Policy (Snapshot)" https://documentation.commvault.com/commvault/v11/article?p=60105_1.htm, Sep. 12, 2019, 3 pages.

Oracle, "Managing Snapshots," https://docs.cloud.oracle.com/en-us/iaas/Content/File/Tasks/managingsnapshots.htm, 2020, 3 pages.

U.S. Appl. No. 16/260,660, filed Jan. 29, 2019, and entitled "System and Method for Aggregating Metadata Changes in a Storage System."

U.S. Appl. No. 16/861,986 filed in the name of Vladimir Shveidel et al. filed Apr. 29, 2020, and entitled "Lockless Metadata Binary Tree Access."

U.S. Appl. No. 16/862,733 filed in the name of Alexander S. Mathews et al. filed Apr. 30, 2020, and entitled "Finding Storage Objects of a Snapshot Group Pointing to a Logical Page in a Logical Address Space of a Storage System."

U.S. Appl. No. 16/862,735 filed in the name of Dixitkumar Vishnubhai Patel et al. filed Apr. 30, 2020, and entitled "Mapping Virtual Block Addresses to Portions of a Logical Address Space that Point to the Virtual Block Addresses."

U.S. Appl. No. 16/862,740 filed in the name of Rohit K. Chawla et al. filed Apr. 30, 2020, and entitled "Generating Recommendations for Initiating Recovery of a Fault Domain Representing Logical Address Space of a Storage System."

U.S. Appl. No. 16/863,433 filed in the name of Sorin Faibish et al. filed Apr. 30, 2020, and entitled "Cache Retention for Inline Deduplication Based on Number of Physical Blocks with Common Fingerprints Among Multiple Cache Entries."

U.S. Appl. No. 16/879,459 filed in the name of Yousheng Liu et al. filed May 20, 2020, and entitled "Reusing Overwritten Portion of Write Buffer of a Storage System."

U.S. Appl. No. 16/888,668 filed in the name of Kundan Kumar et al. filed May 30, 2020, and entitled "Selective Snapshot Creation Using Source Tagging of Input-Output Operations."

U.S. Appl. No. 16/897,388 filed in the name of Alex Soukhman et al. filed Jun. 10, 2020, and entitled "Garbage Collection in a Storage System at Sub-Virtual Block Granularity Level."

\* cited by examiner

REGULATING STORAGE DEVICE REBUILD RATE IN A STORAGE SYSTEM

FIELD

The field relates generally to information processing, and more particularly to storage in information processing systems.

BACKGROUND

Storage arrays and other types of storage systems are often shared by multiple host devices (hosts) over a network. Applications running on the host devices each include one or more processes that perform the application functionality. Such processes issue input-output (IO) operation requests for delivery to the storage systems. Storage controllers of the storage systems service such requests for IO operations. The IO operations include, but are not limited to, read operations and write operations performed in accordance with data stored or data to be stored on storage devices (e.g., drives or disks) of the storage system. The storage system is typically comprised of a plurality of storage devices that are arranged in some form of an array group, e.g., a redundant array of independent disks (RAID).

When a drive in a storage system goes offline (e.g., ceases performance of IO operations because of a failure and/or some other reason) and needs to be rebuilt using spare capacity (typically, spare drives in the array are ready to be used for the rebuild process), the operation of rebuilding a drive can be relatively time consuming e.g., running into hours. The rebuild can also be expensive requiring the reading and writing of terabytes of data. Further, the rebuild requires otherwise limited central processing unit (CPU) computation capacity associated with the storage system to be used in order to reconstruct the data (that was on the offline drive) from one or more other surviving (online) drives in the RAID group and onto a spare drive.

SUMMARY

Illustrative embodiments of the present disclosure provide techniques for regulating a rebuild rate of one or more storage devices in a storage system.

For example, in one embodiment, an apparatus comprises at least one processing device comprising a processor coupled to a memory. The at least one processing device is configured to obtain a set of rebuild rate parameters for a given storage device from a storage array comprising a plurality of storage devices, and dynamically regulate a rebuild rate associated with a rebuild process for the given storage device based on the set of rebuild rate parameters obtained from the storage array for the given storage device.

For example, in one embodiment, the set of rebuild rate parameters include a rebuild capacity parameter and a rebuild time parameter, and the rebuild rate can be controlled by setting and adjusting a priority level based on a comparison of the parameters.

Advantageously, illustrative embodiments, inter alia, adjust the rebuild rate to take advantage of any idle cycles in the storage system and allow for other critical operations to take priority over rebuild if the rebuild process is ahead of its required rebuild rate. This minimizes the impact of a rebuild over other system operations and their performance.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
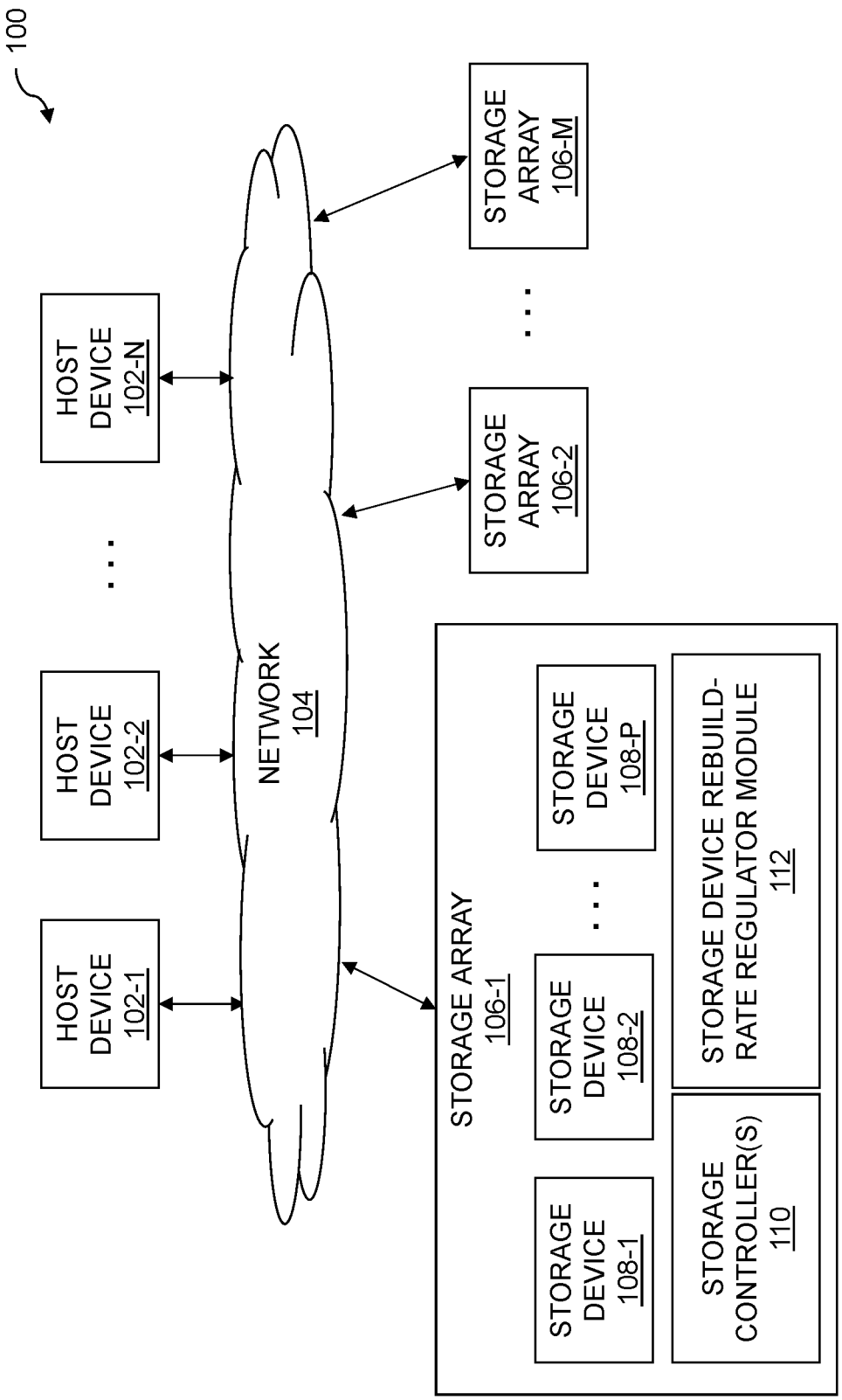
FIG. 1 is a block diagram of an information processing system including a storage array configured with functionality for regulating a rebuild rate of one or more storage devices in the storage array in an illustrative embodiment.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands, e.g., a read operation comprises one or more read commands and a write operation comprises one or more write commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments, the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage array 106-1 in its persistent memory. The response time control module is assumed to operate in conjunction with the above-noted IO operation priority queues.

The storage array 106-1 illustratively utilizes its IO operation priority queues to provide different levels of performance for IO operations. For example, the IO operation priority queues may have respective different priority levels. The storage array 106-1 may be configured to provide different priority levels for different ones of the IO operations by assigning different ones of the IO operations to different ones of the IO operation priority queues. The IO operation priority queues are illustratively associated with respective SLOs for processing of IO operations in the storage array 106-1.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage array 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIGS. 4 and 5.

The storage array 106-1 implements a storage device rebuild-rate regulator module 112, which is an example of what is referred to herein as a "control module" of a storage system. As mentioned above in the background section, when a drive (such as, e.g., storage device 108-1) goes offline and needs to be rebuilt using spare capacity, the operation of rebuilding the drive can be time consuming. It is realized herein that there are competing requirements dictating the rate of rebuild operations. For example, two competing requirements may include resiliency and IO performance. To maintain "5-9s" resiliency (e.g., a high availability rate such as 99.999%) among the drives of the storage system, the rebuild of a drive needs to be completed within a certain time period (typically a few hours). Thus, running as many parallel operations as possible to complete the rebuild of the drive is preferred. However, since rebuild operations are computationally expensive, running too many of them in parallel would impact host IO performance or whatever else is running in the system. Thus, a lower rebuild rate is better to minimize impact on system performance. The challenge is to find a solution which manages the rebuild rate such that the resiliency requirement is met and also impact on system performance is minimized. In accordance with illustrative embodiments, storage array 106-1 achieves this balanced solution via the storage device rebuild-rate regulator module 112 as will be further explained herein.

Although not explicitly shown in FIG. 1 for clarity of illustration, it is assumed in some embodiments that other ones of the storage arrays 106-2 through 106-M implement respective additional instances of a storage device rebuild-rate regulator module, as well as respective sets of storage devices and storage controllers in a manner similar to that described herein with respect to storage array 106-1. Also, in some embodiments, a single instance of the storage device rebuild-rate regulator module 112 can perform one or more storage device rebuild-rate regulation operations not only on storage array 106-1 but also on one or more of storage arrays 106-2 through 106-M. Further, although shown in FIG. 1 as being external to the storage controllers 110 of storage array 106-1, in other embodiments, the storage device rebuild-rate regulator module 112 may be implemented at least partially within one or more of the storage controllers 110. For example, at least one of the storage controllers 110 may be implemented as a virtual storage controller running on an embedded hypervisor of the storage array 106-1. At least part of the storage device rebuild-rate regulator module 112 may be part of such a virtual storage controller, or may be run separate from the virtual storage controller on such an embedded hypervisor. An example of an embedded hypervisor is described below in the context of FIG. 2. Various other arrangements are possible, including where at least a portion of the functionality of the storage device rebuild-rate regulator module 112 is implemented external to the storage array 106-1 (e.g., on a separate server, on a cloud computing infrastructure, etc.).

Furthermore, it is to be appreciated that module 112 may also be configured to provide not only rebuild-rate functionalities but also the storage device rebuild functionalities themselves and/or one or more other regulated functionalities of storage array 106-1.

Functionality of the storage device rebuild-rate regulator module 112 may be implemented at least in part in the form of software that is stored in memory and executed by a processor. It is to be understood that the particular set of elements shown in FIG. 1 involved in rebuild-rate regulation operations is presented by way of illustrative example only and, in other embodiments, additional or alternative elements may be used. Thus, another embodiment may include additional or alternative systems, devices and other network entities, as well as different arrangements of modules and other components. It is to be appreciated that these and other features of illustrative embodiments are presented by way of example only, and should not be construed as limiting in any way.

Functionality of the storage device rebuild-rate regulator module 112 will be further described herein. Before describing rebuild-rate regulation functionality, an embedded hypervisor of a log structured storage system within which the storage device rebuild-rate regulator module 112 can be implemented in accordance with illustrative embodiments will be described in the context of FIG. 2. However, it is to be understood that embodiments are not limited to a log structured storage system or any particular storage system. Further, it is to be understood that embodiments can be implemented in storage systems that do not implement embedded hypervisors.

Figure 2:
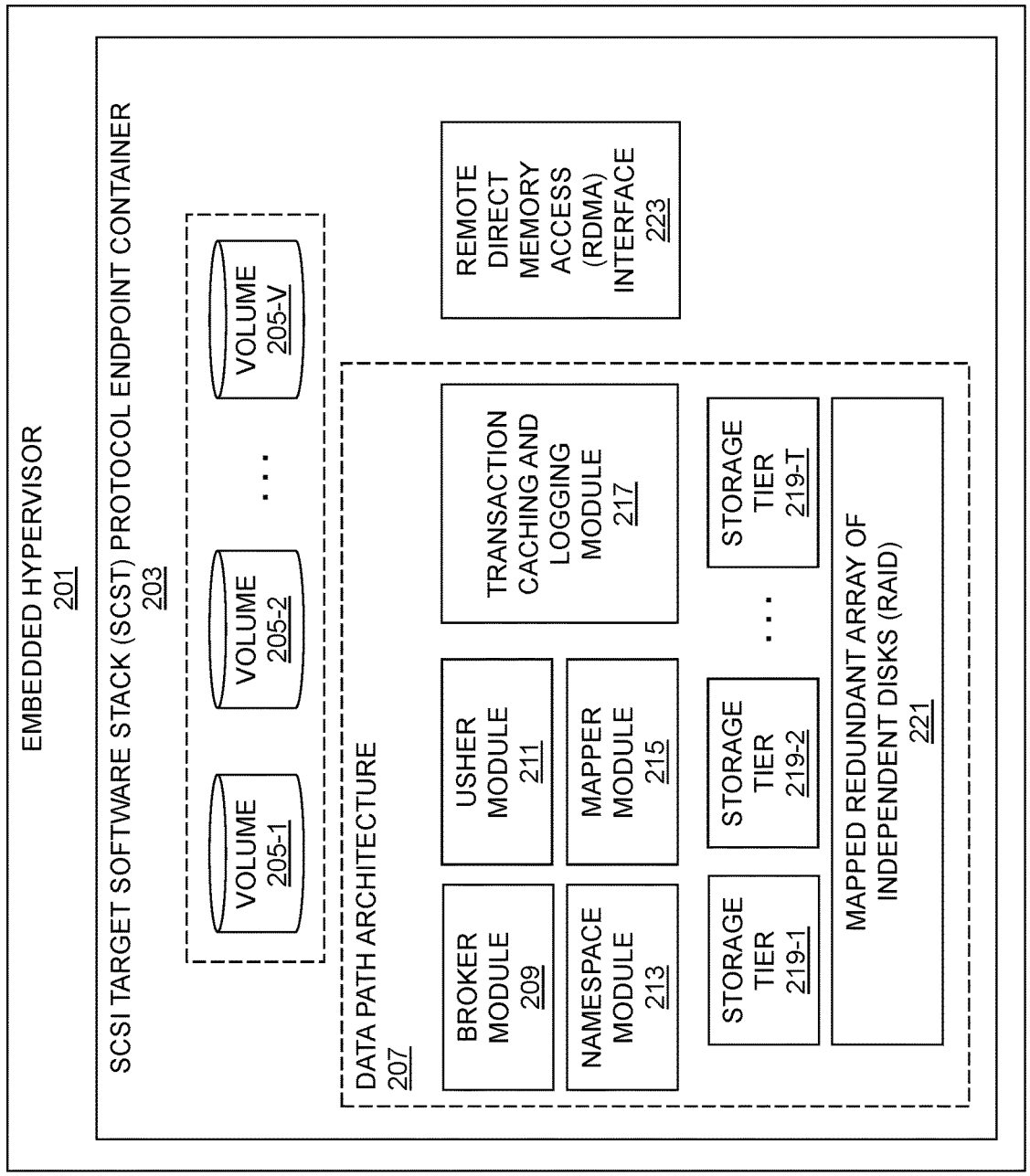
FIG. 2 is a block diagram of an embedded hypervisor implementing a data path architecture in an illustrative embodiment.

FIG. 2 shows a view of a data path architecture 207 for an IO stack of a storage array (e.g., storage array 106-1). The data path architecture 207 is assumed to be implemented on an embedded hypervisor 201 (e.g., a VMware ESXi™ hypervisor) that runs a base container 203 providing an SCSI target software stack (SCST) protocol endpoint. The embedded hypervisor 201 is an example of a "virtual" storage controller of a storage system (e.g., a virtual one of the storage controllers 110 in storage array 106-1). The SCST protocol endpoint container 203 includes a set of volumes 205-1, 205-2, . . . 205-V (collectively, volumes 205) and the data path architecture 207. The data path architecture 207 includes a broker module 209, usher module 211, namespace module 213, mapper module 215, and a transaction caching and logging module 217. The data path architecture 207 also includes a set of storage tiers 219-1, 219-2, . . . 219-T (collectively, storage tiers 219) and a mapped redundant array of independent disks (RAID) 221. The transaction caching and logging module 217 is configured to utilize remote direct memory access (RDMA) interface 223 as described in further detail below.

The broker module 209 is configured to facilitate communication amongst the various other modules of the data path architecture 207. In some embodiments, the data path architecture 207 implements a layered services model (e.g., for copy engines, replication, migration, etc.). The usher module 211 is configured to implement IO request queues, including priority share-based scheduling and Quality of Service (QoS) for IO requests in such queues. The namespace module 213 is configured to implement active/active "thin" volumes and maintain volume attributes. The namespace module 213 is also configured to implement a key-value (K-V) store and directories. The mapper module 215 is configured to implement a thin mapping layer using log-structured writes, with inline compression, deduplication and pattern matching functionality. The mapper module 215 is also configured to implement functionality for snapshotting and determining snapshot differentials, for performing space accounting, and for file system checking (e.g., using a tool such as a Linux file system consistency check (FSCK) tool). The transaction caching and logging module 217 is configured to implement transactions for the active/active volumes, to perform distributed locking, and to implement read/write-back and write-ahead logs. The transaction caching and logging module 217 may comprise two instances, one for data and one for metadata. The mapped RAID 221 is configured to implement distributed virtual striping (e.g., using 4+1 and 8+1 RAIDS implementations) and to provide thin rebuild and distributed sparing. The mapped RAID 221 may support various native block sizes (e.g., 512 bytes (B), 4096B or 4 kilobytes (KB), etc.).

In some embodiments, the usher module 211 implements a data plane polling model. From the producer side (e.g., of the SCST protocol endpoint), requests are submitted using per-core threads. Polling threads pull new IO requests to user space. The polling threads may execute when associated data plane threads are idle. Load balancing, affinity and QoS (e.g., share-based scheduling and traffic shaping) features may be provided.

The namespace module 213, as described above, is configured to create and expose thin block volumes, and provides functionality for volume management and attributes as well as space management and accounting. The namespace module 213 enables or provides a namespace layer that utilizes a block interface with file-like semantics. In the namespace layer, volumes (e.g., volumes 205) are bound to block protocol endpoints (e.g., PE LUNs). The mapper module 215 enables or provides a mapping layer, which exposes a single contiguous thin address space to the namespace layer. The namespace layer consumes the logical address space provided by the mapper layer.

The namespace layer may use a format that includes a "super block" created by an internal format and anchored at a logical block address (LBA) of 0. The super block identifies locations of allocations, an inode table, and a "root" directory. The allocations provide references to extent allocators, used to manage free space, as well as to inodes. The extent allocators may use a binary buddy system, and enable reclaiming and defragmenting (i.e., garbage collection) functionality. In some embodiments, the minimum allocation size is 8 MB, and the minimum allocation size for virtual volumes (VVols) such as volumes 205 is 2 GB. The volume allocation aligns to the "mid" level of the mapper as described in further detail below.

The inode allocators provide references to an inode table, which in some embodiments is scalable to millions of inodes and is organized as a free list. An inode may include various content, such as an object type (e.g., file, directory), family universally unique identifier (UUID), inode number and generation, link count, unique identifier (UID) owner, global identifier (GID) owner, object extent location, create and other timestamps, parent inode number, parent directory cookie, etc. The root inode references a root directory object that contains a list of file names and inodes, while additional inodes contain volume data (e.g., by allocating a data extent and inode, and adding the volume name and inode to the root directory). Multiple volume data extents may be created. Object handles may be used by the usher module 211 to submit IO thru handles (e.g., inodes) to avoid unnecessary name lookup.

The transaction caching and logging module 217 may implement a transaction cache and a transaction log. The transaction cache, in some embodiments, is transactional and provides read and write cache buffering with two instances (e.g., data and metadata). The transaction cache pages data and metadata in and out of memory, and provides local and distributed peer-to-peer (P2P) sticky locks. In some embodiments, an active/active configuration, an ALUA configuration, or combination thereof may be used. For example, the data path architecture 207 may be active/active, while SCST supports both active/active and ALUA. The transaction log provides write-ahead transaction logs, such as by using low latency mirrored NVRAMs for persistence. The transaction cache, for example, may be implemented in-memory (e.g., DRAM), while the transaction log is persisted to NVRAM.

The mapper module 215, as noted above, may provide a mapping layer of the data path architecture 207. The mapping layer may provide various functionality, such as enabling patterns, deduplication, compression, and mapping. Pattern functionality includes storing patterns (e.g., rather than pointer+data), and re-generates data on read, and may include 4 KB of 0 s or 1 s (where, in this context, 0 s are different than unmapped space). Deduplication functionality includes the use of a fingerprint cache and read and compare validation. Compression functionality may include the use of various types of compression algorithms, including QAT hardware offload, LZ Deflate, Dynamic Huffman, etc. In some embodiments, data is compressed and packed into 2 MB data stripes. The mapping functionality includes a thin map, implemented in some embodiments as a 512-way B-tree structure described in further detail below. The thin map in such embodiments is keyed by LBA (e.g., rather than using content-addressable storage (CAS)), and provides snapshot and differential capability along with copy-by-reference. The mapper module 215 may utilize the storage tiers 219 (e.g., using flash tiers, storage-class memory (SCM) tiers, NVRAM tiers, etc.).

To implement deduplication, a deduplication "fingerprint" cache may be utilized. The fingerprint cache may be implemented as a large K-V store, with N-way associative hashes providing fast, in-memory lookup that enables verification of deduplication with read and compare. Consider a piece of data, denoted $data_1$, that is found in the fingerprint cache. This may include hashing $data_1$, where the hash matches a key in the K-V store corresponding to a given virtual large block (VLB). The given VLB is then fetched to find the page referenced, and the corresponding portion of the associated physical large block (PLB) is read, decompressed and then compared to verify that $data_1$ is a duplicate. It is to be understood that a PLB represents the 2 MB data stripe that is mentioned herein regarding the mapper module and a VLB is a higher level object that provides the tracking for individual pieces of user data on the PLBs as well as providing an abstraction layer that supports re-organization and garbage collection of the physical data.

Consider another piece of data, denoted $data_2$, that is not found in the fingerprint cache. In this case, a new entry is added to the K-V store (e.g., a new K-V pair). If there is no remaining space, entries may be evicted using any suitable cache replacement algorithm, such as a least recently used (LRU) cache replacement algorithm. The $data_2$ is then stored as a new 4 KB data block in one of the PLBs.

The mapper module 215 may implement log-structured writes for efficient full stripe RAID writes (e.g., where each stripe is 2 MB continuing the example above) to flash memory using mapped RAID 221. Pending writes are flushed from the transaction cache or transaction log cache implemented by transaction and log caching module 217. Patterns and duplications are subtracted, then the data is compressed and packed into a stripe. The full stripe is then written and mapped to the thin address space.

Figure 3A:
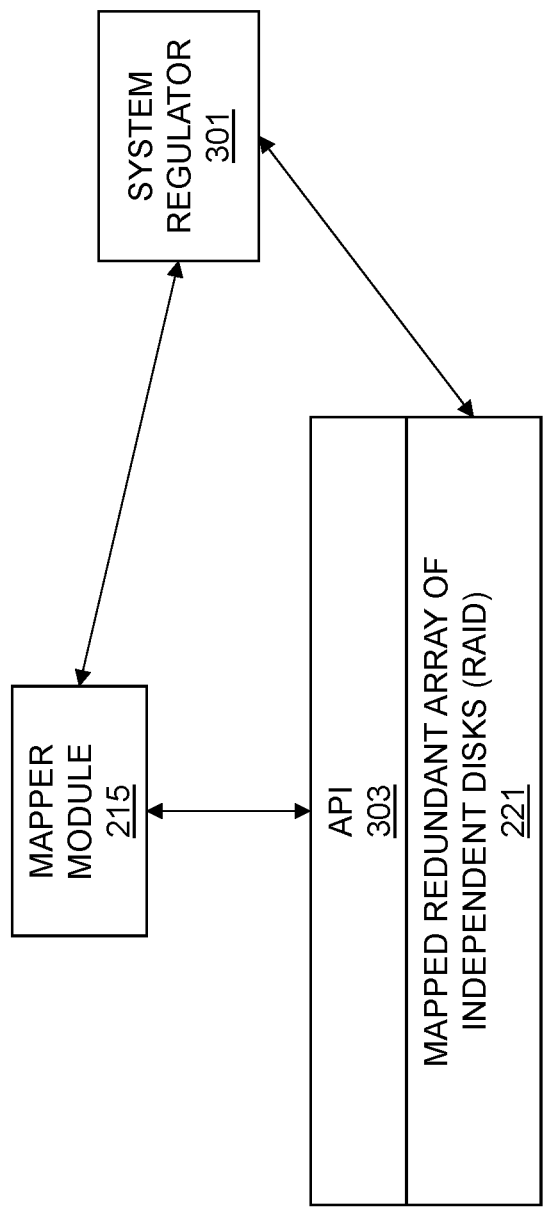
FIG. 3A is a block diagram of one or more modules for regulating a rebuild rate of one or more storage devices in an illustrative embodiment.
Figure 3B:
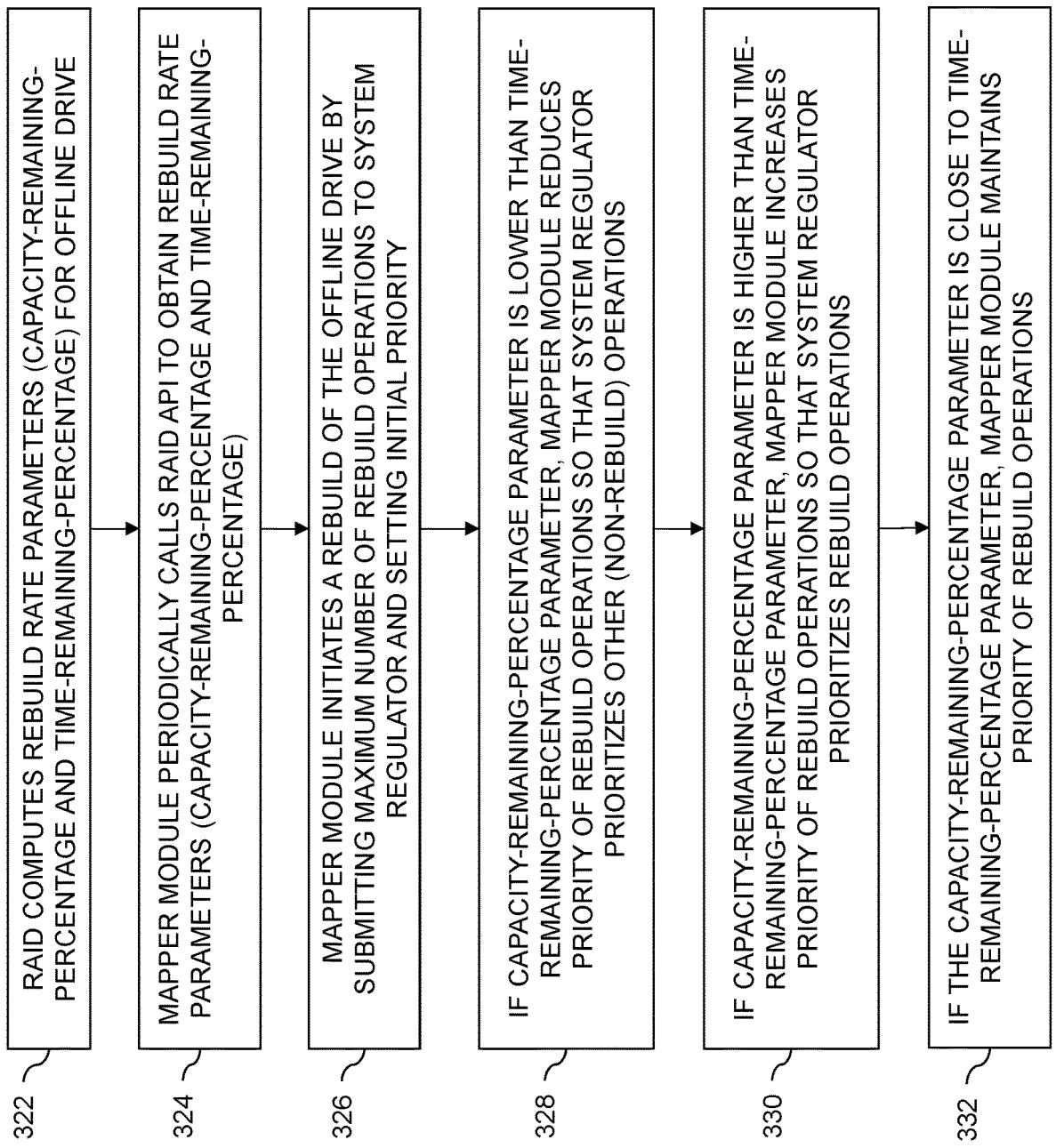
FIG. 3B is a flow diagram of an exemplary process for regulating a rebuild rate of one or more storage devices in an illustrative embodiment.

According to an illustrative embodiment, rebuild-rate regulation is dynamically managed between a set of modules/components of the storage system as shown in FIG. 3A, e.g., mapper module 215, RAID 221 and a system regulator 301. FIG. 3B depicts main steps (steps 322 through 332) that are performed by and between such modules/components during the rebuild-rate regulation process.

RAID 221 provides an application programming interface (API) 303 that the mapper module 215 calls periodically during the rebuild process. This API 303 returns two parameters as percentages: (i) a rebuild capacity remaining percentage (capacity-remaining-percentage); and (ii) a rebuild time remaining percentage (time-remaining-percentage). When a drive (disk) in the RAID 221 goes offline, RAID 221 determines (step 322) capacity of the drive that needs to be rebuilt and the time available to complete the rebuild (e.g., to maintain "5-9 s" resiliency). RAID 221 provides these two parameters as percentages via API 303 (step 324). At the start of the rebuild process, API 303 would return 100% rebuild capacity remaining and 100% of time remaining to the mapper module 215.

Mapper module 215 at the start of the rebuild process submits a maximum number of parallel rebuild operations to system regulator 301 but sets (step 326) the priority of the rebuild operations as medium (e.g., wherein there are three priority levels of low, medium and high). The maximum number of operations is chosen such that when all the operations are running in parallel, rebuild can be completed faster than the required rebuild rate to maintain 5-9 s resiliency.

System regulator 301 schedules the rebuild operations based on how busy the system is. If the storage system is idle or not very busy, then the maximum number of rebuild operations are run in parallel exceeding the required rebuild rate. If the storage system is busy, system regulator 301 only schedules a limited number of rebuild operations in parallel thereby falling behind the required rebuild rate.

Mapper module 215 periodically calls API 303 of RAID 221 to check the rebuild progress. If the capacity-remaining-percentage parameter is lower (less) than the time-remaining-percentage parameter, then mapper module 215 decreases (reduces) the priority of the rebuild operations (e.g., from medium to low) so that system regulator 301 can prioritize other operations (i.e., non-rebuild operations) for execution (step 328). Whereas, if the capacity-remaining-percentage parameter is higher (greater) than the time-remaining-percentage parameter, then mapper module 215 increases the priority of the rebuild operations (e.g., from medium to high) so that system regulator 301 can prioritize rebuild operations over other operations running in the system (step 330). If the capacity-remaining percentage parameter and the time-remaining-percentage parameter are close to each other (substantially similar), priority is maintained (step 332). How close the parameter percentages are to maintain the priority level or to adjust it can be prespecified in advance by a system administrator and/or system. In all cases, the maximum number of parallel operations are submitted to system regulator 301 to allow for system regulator 301 to make the scheduling decisions (also, e.g., if the storage system is idle, all operations are scheduled irrespective of the priority).

In an alternative embodiment, rather than track and report a parameter (capacity and time) remaining percentage, RAID 221 can track and report a parameter (capacity and time) completed percentage. For example, in the alternative embodiment, RAID 221 can return a cyc_raid_rebuild_priority_info_t data structure with the following members: (i) rebuild_capacity which is a percentage of degraded capacity that has been rebuilt; and (ii) rebuild_rate which is a percentage of rebuild time that has elapsed within the allotted time window to meet 5-9 s reliability. Thus, at the start of the rebuild process, rebuild capacity=0% and time rebuilding=0%.

Accordingly, the two rebuild parameters that are returned via the API 303 can be: (i) rebuild capacity-remaining-percentage and rebuild time-remaining-percentage; or (ii) rebuild capacity-completed-percentage and rebuild time-completed percentage. More generally, the two parameters may be referred to as "a rebuild capacity parameter" and "a rebuild time parameter."

Note that, in illustrative embodiments, one or more of the modules/components shown in FIG. 3A may be implemented as part of storage device rebuild-rate regulator module 112 in storage array 106-1 of FIG. 1 or, more generally, in a regulator module that performs multiple storage array regulation functionalities.

Advantageously, illustrative embodiments dynamically adjust the rebuild rate to take advantage of any idle cycles in the storage system and allow for other critical operations to take priority over rebuild if the rebuild process is ahead of its required rebuild rate. This minimizes the impact of a rebuild over other system operations and their performance.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for regulating a rebuild rate of a storage device of a storage system will now be described in greater detail with reference to FIGS. 4 and 5. Although described in the context of system 100, these platforms may also be used to implement at least portions of other information processing systems in other embodiments.

Figure 4:
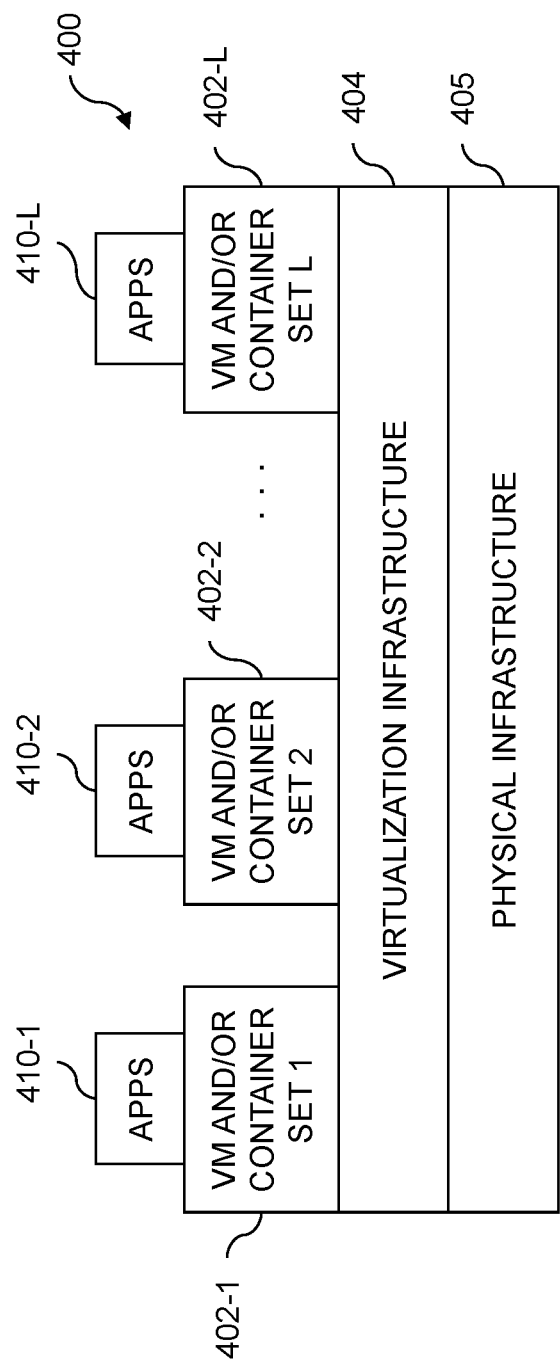
FIGS. 4 and 5 show examples of processing platforms that may be utilized to implement at least a portion of an information processing system in illustrative embodiments.
Figure 5:
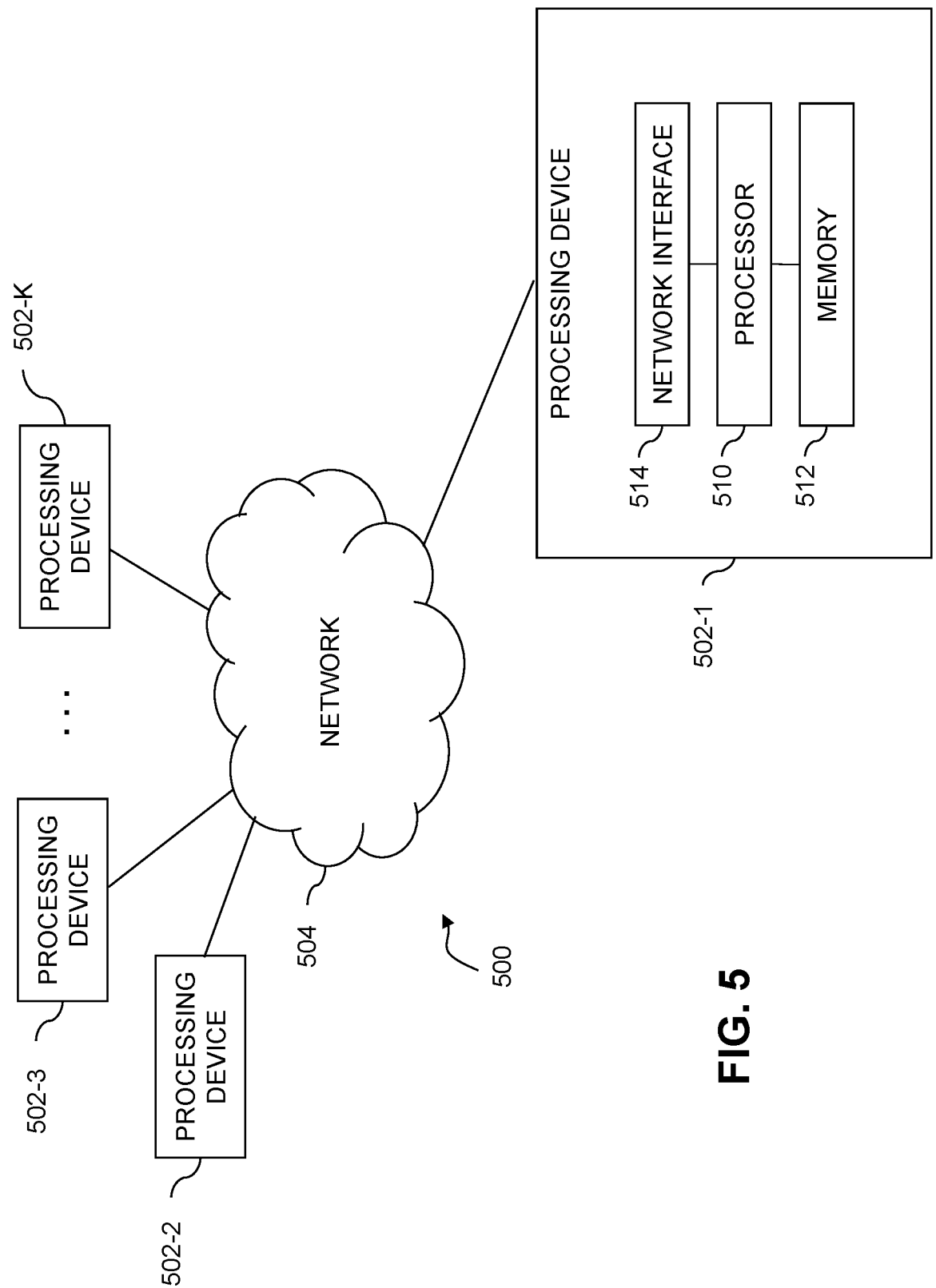

FIG. 4 shows an example processing platform comprising cloud infrastructure 400. The cloud infrastructure 400 comprises a combination of physical and virtual processing resources that may be utilized to implement at least a portion of the information processing system 100 in FIG. 1. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. A hypervisor platform may be used to implement a hypervisor within the virtualization infrastructure 404, where the hypervisor platform has an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for managing one or more write operations by reusing one or more overwritten portions of a write buffer of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage devices, tree structures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to:
   obtain a set of rebuild rate parameters for a given storage device from a storage array comprising a plurality of storage devices; and
   dynamically regulate a rebuild rate associated with a rebuild process for the given storage device based on the set of rebuild rate parameters obtained from the storage array for the given storage device;
   wherein dynamically regulating the rebuild rate associated with the rebuild process for the given storage device comprises:
   setting a rebuild priority level for the given storage device;
   monitoring the rebuild process; and
   adjusting a number of parallel rebuild operations performed by the storage array for the given storage device in response to a change in the rebuild priority level of the given storage device; and
   wherein the change in the rebuild priority level is based on the obtained set of rebuild rate parameters of the given storage device and on a number of additional operations other than rebuild operations being executed by the storage array.

2. The apparatus of claim 1, wherein obtaining the set of rebuild rate parameters for the given storage device further comprises receiving a rebuild capacity parameter and a rebuild time parameter as part of the set of rebuild rate parameters for the given storage device.

3. The apparatus of claim 2, wherein dynamically regulating the rebuild rate associated with the rebuild process for the given storage device further comprises adjusting the rebuild priority level based on a comparison of the rebuild capacity parameter and the rebuild time parameter.

4. The apparatus of claim 3, wherein adjusting the rebuild priority level based on the comparison of the rebuild capacity parameter and the rebuild time parameter further comprises increasing the rebuild priority level when the rebuild capacity parameter is greater than the rebuild time parameter.

5. The apparatus of claim 3, wherein adjusting the rebuild priority level based on the comparison of the rebuild capacity parameter and the rebuild time parameter further comprises decreasing the rebuild priority level when the rebuild capacity parameter is less than the rebuild time parameter.

6. The apparatus of claim 3, wherein when the rebuild capacity parameter and the rebuild time parameter are within a predefined percentage of each other as specified by one of a system administrator and a system, the rebuild priority level is maintained.

7. The apparatus of claim 1, wherein the plurality of storage devices are part of a RAID group.

8. The apparatus of claim 1, further including:
assigning a maximum number of parallel rebuild operations associated with the rebuild priority level for the given storage device; and
based, at least in part on monitoring the rebuild process, at least one of:
reducing a number of parallel rebuild operations relative to the maximum number to reduce the rebuild rate; or
maintaining the maximum number of parallel rebuild operations to exceed the rebuild rate.

9. A computer program product comprising a non-transitory processor-readable storage medium having stored therein program code of one or more software programs, wherein the program code when executed by at least one processing device causes the at least one processing device to perform steps of:
obtaining a set of rebuild rate parameters for a given storage device from a storage array comprising a plurality of storage devices; and
dynamically regulating a rebuild rate associated with a rebuild process for the given storage device based on the set of rebuild rate parameters obtained from the storage array for the given storage device;
wherein dynamically regulating the rebuild rate associated with the rebuild process for the given storage device comprises:
setting a rebuild priority level for the given storage device;
monitoring the rebuild process; and
adjusting a number of parallel rebuild operations performed by the storage array for the given storage device in response to a change in the rebuild priority level of the given storage device; and
wherein the change in the rebuild priority level is based on the set of obtained rebuild rate parameters of the given storage device and on a number of additional operations other than rebuild operations being executed by the storage array.

10. The computer program product of claim 9, wherein obtaining the set of rebuild rate parameters for the given storage device further comprises receiving a rebuild capacity parameter and a rebuild time parameter as part of the set of rebuild rate parameters for the given storage device.

11. The computer program product of claim 10, wherein dynamically regulating the rebuild rate associated with the rebuild process for the given storage device further comprises adjusting the rebuild priority level based on a comparison of the rebuild capacity parameter and the rebuild time parameter.

12. The computer program product of claim 11, wherein adjusting the rebuild priority level based on the comparison of the rebuild capacity parameter and the rebuild time parameter further comprises increasing the rebuild priority level when the rebuild capacity parameter is greater than the rebuild time parameter.

13. The computer program product of claim 11, wherein adjusting the rebuild priority level based on the comparison of the rebuild capacity parameter and the rebuild time parameter further comprises decreasing the rebuild priority level when the rebuild capacity parameter is less than the rebuild time parameter.

14. The computer program product of claim 11, wherein when the rebuild capacity parameter and the rebuild time parameter are within a predefined percentage of each other as specified by one of a system administrator and a system, the rebuild priority level is maintained.

15. The computer program product of claim 9, wherein, wherein the plurality of storage devices are part of a RAID group.

16. A method comprising steps of:
obtaining a set of rebuild rate parameters for a given storage device from a storage array comprising a plurality of storage devices; and
dynamically regulating a rebuild rate associated with a rebuild process for the given storage device based on the set of rebuild rate parameters obtained from the storage array for the given storage device;
wherein dynamically regulating the rebuild rate associated with the rebuild process for the given storage device comprises:
setting a rebuild priority level for the given storage device;
monitoring the rebuild process; and
adjusting a number of parallel rebuild operations performed by the storage array for the given storage device in response to a change in the rebuild priority level of the given storage device;
wherein the change in the rebuild priority level is based on the obtained set of rebuild rate parameters of the given storage device and on a number of additional operations other than rebuild operations being executed by the storage array; and
wherein the steps are performed via one or more processing devices.

17. The method of claim 16, wherein obtaining the set of rebuild rate parameters for the given storage device further comprises receiving a rebuild capacity parameter and a rebuild time parameter as part of the set of rebuild rate parameters for the given storage device.

18. The method of claim 17, wherein dynamically regulating the rebuild rate associated with the rebuild process for the given storage device further comprises adjusting the rebuild priority level based on a comparison of the rebuild capacity parameter and the rebuild time parameter.

19. The method of claim 18, wherein adjusting the rebuild priority level based on the comparison of the rebuild capacity parameter and the rebuild time parameter further comprises:
increasing the rebuild priority level when the rebuild capacity parameter is greater than the rebuild time parameter;
decreasing the rebuild priority level when the rebuild capacity parameter is less than the rebuild time parameter; and
maintaining the rebuild priority level when the rebuild capacity parameter and the rebuild time parameter are within a predefined percentage of each other as specified by one of a system administrator and a system.

20. The method of claim 16, wherein the plurality of storage devices are part of a RAID group.

* * * * *